Patented Aug. 30, 1949

2,480,275

UNITED STATES PATENT OFFICE 2,480,275

METHOD OF CRYSTALLIZING SUPER-COOLED WATER DROPLETS

Florence W. van Straten, Green Acres, Md., and William A. Van Allen, Boston, Mass.; said Van Allen assignor to said van Straten No Drawing. Application October 4, 1947, Serial No. 778,020

4 Claims. (Cl. 244—134)

Our invention relates to meteorology and comprises a method of crystallizing super-cooled water droplets lying in the path of an airplane in order to prevent the formation of ice thereon.

The most important object of our invention is to improve the safety with which aircraft operations may be conducted.

Another object of the invention is to increase the military efficiency of aircraft, particularly in frigid regions.

A further object of the invention is to provide practical compact means to be carried by a plane and useful to eliminate the hazard of ice formation on wings and other exposed surfaces.

Although some of the meteorological phenomena involved are not too clearly understood, it is known that the atmosphere may contain, in certain zones, water droplets in a metastable, super-cooled condition at temperatures as low as −35.0° C. It has been shown experimentally that ice crystals and super-cooled water droplets may exist simultaneously in clouds where the upward component of air velocity is sufficient to effect the production of super-cooled droplets faster than they can evaporate over to nearly ice crystals.

Some crystallization of the droplets is brought about as the result of collisions due to Brownian movement of the droplets; the crystallization takes place on dust motes or other nuclei present in the cloud. The rate at which such random crystallization occurs is closely dependent on temperature. For example the rate at −35.2° C. is $10^{12}$ as great as at −34.8° C. If the temperature falls significantly below −35.0° C., substantially all of the droplets will crystallize.

Moreover, if a super-cooled droplet is subjected to distorting stresses as by in intense sound wave or by impact on a moving surface, its metastable condition of equilibrium is disturbed, and it turns almost at once to ice. This is the manner in which ice forms on aircraft wings and the like.

Heretofore the problem of eliminating ice formation on aircraft has been directed along three avenues of attack. One system comprises employing resilient boots for protection of vital surfaces; after ice forms on the boots, the pilot flexes them to crack off the ice. Another method is to conduct a hot fluid to the vicinity of the surface to be protected in order to melt the ice as it forms. Chemical compounds have been applied to such surfaces in order to reduce their adhesive qualities and thereby inhibit ice formation. However, no one thus far has produced a completely satisfactory solution to the problem.

We have discovered that sound waves of proper frequency and intesity may be focused in a beam and used to produce almost instantaneous crystallization of super-cooled water droplets. By mounting a suitable sonic generator and radiator, or horn, upon a plane, we can project a sound beam ahead of the plane and crystallize the super-cooled droplets lying ahead of it. The ice crystals then either bounce off the plane or flow by it in the air stream. Consequently ice does not build up on any of the surfaces thereof.

We believe that the effect of sound waves on the super-cooled droplets is two-fold. Accompanying the sound waves is an adiabatic temperature change; at 150 db. R. M. S. pressure level this change is .05° C., but at 160 db. the change is 1.66° C. Consequently the sudden temperature drop may, in certain cases, act to increase random crystallization to the point where substantially all of the droplets in the immediate vicinity will rapidly crystallize.

Furthermore the pressure gradient accompanying the progressive sound waves brings distorting stresses to bear on the droplets, again disturbing their condition of equilibrium and effecting almost instantaneous crystallization thereof.

Inasmuch as the propellers of a plane emit a considerable volume of sound at various frequencies without affecting the formation of ice, it is obvious that sound per se is not sufficient and that frequency and intensity must be carefully selected if the desired results are to be obtained on a satisfactory scale.

To make full use of the pressure wave aspect of the sound waves the frequency must be such that there will be definite motion of the air with respect to the droplets. Below 1 kc. the droplets will move with the air with almost no relative movement between individual drops. Above 30 kc. the attenuation of sound energy is great, and the necessary intensity must be maintained a sufficient distance ahead of the plane to give the droplets time to crystallize before being struck by the plane. Consequently, 30 kc. would appear to be a preferable upper limit of frequency. However, since the desired effects may be obtained at frequencies up to 100 kc., the scope of our invention is not limited to 30 kc. as an upper limit.

Inasmuch as sound is more easily focused as its frequency increases and since a beam is desired in order to concentrate the available energy in the most useful areas, we find that a frequency of from 15 to 30 kc. is preferable. Incidentally, one advantage of this range is that it lies above the audible limit. Consequently an installation of equipment for performing the method of the invention does not constitute a nuisance from the standpoint of noise.

While the apparatus used forms no part per se of our invention, we suggest the use of a powerful siren capable of producing sound at an intensity of better than 150 db. and at a frequency in the range 15–30 kc. The siren may be coupled to a radiating horn serving to focus the sound from the siren into a fan-shaped beam. By mounting the horn at a central point on the plane, we are able to project a sonic beam along the natural direction of movement of the plane and thereby effect crystallization of super-cooled water droplets lying in its path. The beam is so radiated as to effect crystallization through an area lying sufficiently far ahead of the plane to permit complete crystallization and broad enough to extend completely across the width of the plane.

Having thus disclosed our invention, what we claim as new and desire to secure by Letters Patent of the United States is:

1. A method for preventing ice formation on moving surfaces, comprising crystallizing super-cooled water droplets lying in the path of flight by projecting a sound beam ahead of the moving surface and through a cross-sectional area at least as wide as said surface, said sound beam comprising sound waves at a frequency of 15 kc.–30 kc. and an intensity of greater than 150 decibels, which frequency and intensity will be sufficient to cause vibration which imparts sufficient distortional stresses within the droplets to crystallize the same.

2. A method for crystallizing super-cooled water droplets suspended in air, comprising subjecting the droplets and surrounding air to the action of sound waves having an intensity of at least 150 db. and at a frequency of from one to one hundred kilocycles, which frequency and intensity will be sufficient to cause vibration which imparts sufficient distortional stresses within the droplets to crystallize the same.

3. A method for crystallizing super-cooled water droplets suspended in air, comprising subjecting the droplets and surrounding air to the action of sound waves having an intensity of at least 150 db. and at a frequency above the audible limit but less than 100 kc., which frequency and intensity will be sufficient to cause vibration which imparts sufficient distortional stresses within the droplets to crystallize the same.

4. A method of protecting a moving surface against ice formation, comprising crystallizing super-cooled water droplets lying in the path of movement by projecting a sound beam ahead of and in the direction of travel of the surface, the sound beam comprising sound waves at a frequency between 15 and 100 kc. at an intensity of at least 150 db., which frequency and intensity will be sufficient to cause vibration which imparts sufficient distortional stresses within the droplets to crystallize the same.

FLORENCE W. van STRATEN.
WILLIAM A. VAN ALLEN.

REFERENCES CITED

The following references are of record in the file of this patent:

UNITED STATES PATENTS

| Number | Name | Date |
| --- | --- | --- |
| 1,980,171 | Amy | Nov. 13, 1934 |